United States Patent Office 2,785,651
Patented Mar. 19, 1957

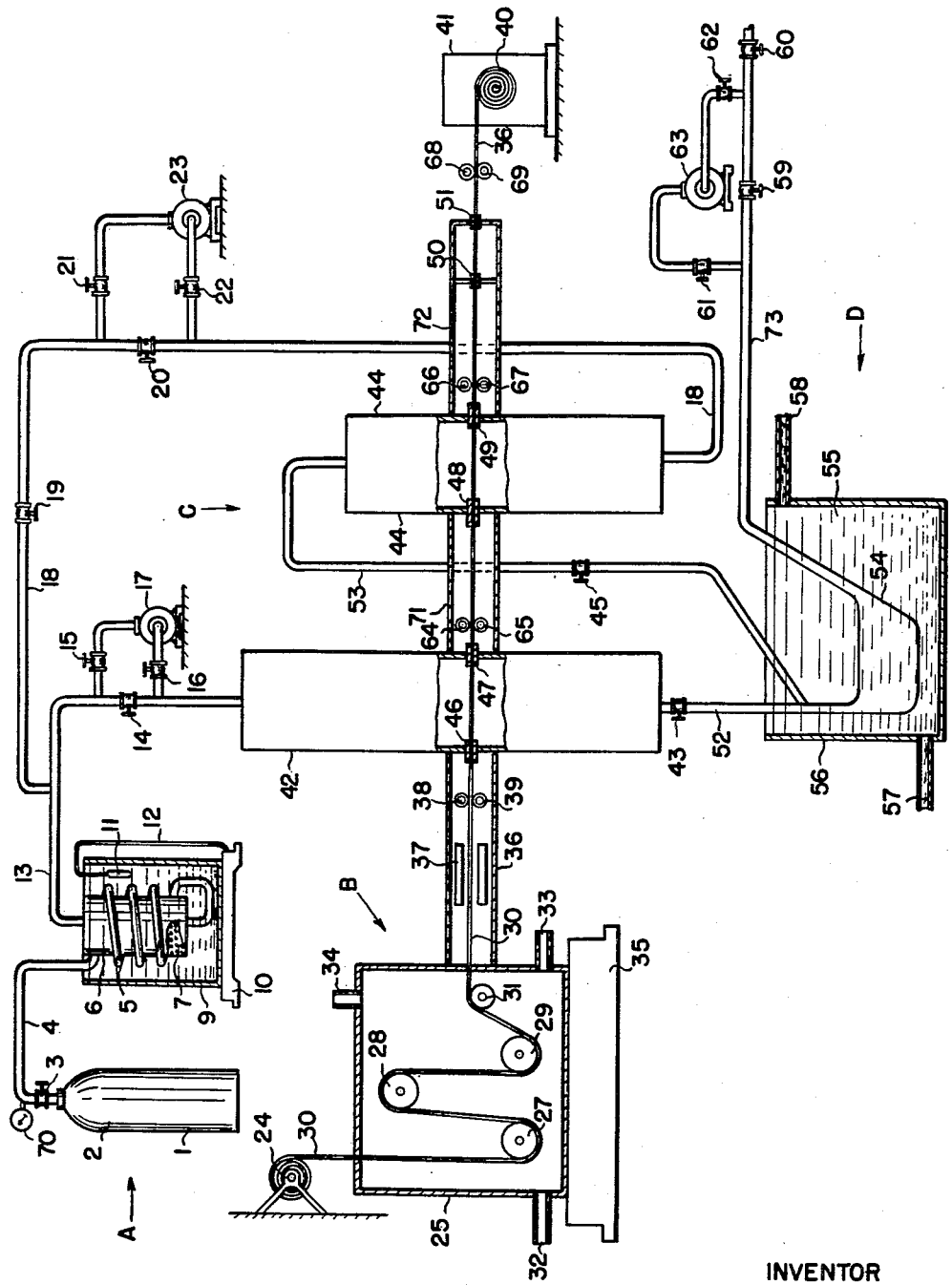

2,785,651

APPARATUS FOR GAS PLATING CONTINUOUS LENGTHS OF MATERIAL

Peter Pawlyk, Dayton, Ohio, assignor to The Commonwealth Engineering Company of Ohio, Dayton, Ohio, a corporation of Ohio Original application October 8, 1951, Serial No. 250,307. Divided and this application November 3, 1953, Serial No. 390,961

2 Claims. (Cl. 118—49)

This invention relates to the treatment of substantially continuous lengths of electrically non-conductive materials to deposit metallic films on the surface thereof, and to the product produced by such treatment.

This application is a division of Peter Pawlyk application, Serial No. 250,307, filed October 8, 1951, and assigned to the same assignee as the present invention.

This application is related to co-pending applications, Serial Nos. 250,301, now Patent No. 2,700,365; 250,302, now Patent No. 2,704,727; 250,303, now Patent No. 2,694,651; 250,304, now Patent No. 2,685,532; 250,305, now Patent No. 2,704,728 and 250,306, now Patent No. 2,729,190, all filed October 8, 1951, and all by the same inventor as the present application.

This invention contemplates the provision of an apparatus for the deposition of metal from gaseous metal-bearing compounds onto electrically non-conductive materials in which the conditions of operation vital to the attainment of a pure metallic coating are readily controlled.

A particularly important feature of the invention is that it may be practiced to gas plate with most metal-bearing compounds at pressures which are substantially atmospheric, it being only necessary to give sufficient velocity to the moving gases to procure their passage over the material to be plated.

The invention also contemplates the provision of apparatus for effecting continuous thermal decomposition of the metal-bearing gases in contact with a heated electrically non-conductive material to insure the securing of fine metal coatings. To effect this the apparatus is arranged in such manner that pressures slightly above and below atmospheric may be attained as desired by simple control means.

The invention further contemplates an improved apparatus for use in the production of new and novel products comprising a base of electrical insulating material and a conductive metallic coating on the outside thereof. For example, a glass fabric, asbestos fabric, or a glass wool material, or substantially any continuous insulated material may be coated with a conductive film of metal. Such products find utility in the electrical arts, as in electrical condenser apparatus where conductivity and high resistance to temperature are prerequisites.

The objects of the invention are achieved by passing from a constant temperature system a heated plating gas, comprised of a metal-bearing compound and a carrier, across the surface of heated insulated material moving in a plating chamber from a preheating system wherein the material is heated in two steps to avoid thermal shock. The hot vapors of metal-bearing compound decompose, depositing metal on the heated insulating material when contact is made therebetween. Preferably, to secure uniformity of plating, the plating gas is first passed across the material in one direction and across the material in an opposite direction without intermediate cooling.

Metal-bearing compounds useful for the invention suitably include copper acetyl-acetonate, chromium carbonyl and nickel carbonyl. While I prefer to use carbon dioxide as the carrier gas with such metal-bearing compounds, and the detailed information hereinafter will refer particularly to the use of carbon dioxide, other insert gases, such as nitrogen, hydrogen, argon and helium, are equally suited and where employed only minor adjustments in the apparatus of invention will be required, as will be understood by those skilled in the art.

The temperature of the electrical insulating material when contacted by the plating gases is an important consideration in the practice of the invention as it is the heat of the insulating material which effects the decomposition of the metal-bearing compound. The temperature of the insulating material is then to some extent related to the gaseous metal-bearing compound and must be higher than the temperature at which decomposition of the metal-bearing gaseous compound is initiated, but may not be so high that the plating atmosphere will be heated to such an extent that premature decomposition takes place. For example, poor deposits will result if the metal-bearing compound decomposes at a distance from the surface of the insulating material.

The temperature of the insulating material is also limited by the inherent characteristics of the material and must not be so high that the material may be affected thereby. This last factor will not in general be unduly limiting since the characteristics of most insulating materials are such that they may be readily heated beyond the temperature at which most plating gases decompose. In any event I prefer to preheat the insulating material in a preheating system to such a temperature as to insure that heating of the metal-bearing gases to the decomposition point takes place at or closely adjacent the surface of the insulating material and also by this preheating means to avoid thermal shock in the material. The preheating temperature may generally be about ⅓ of the final temperature and a short period of stabilization is desirable between the heatings. Accordingly, I also prefer to vaporize the metal-bearing compounds at as low a temperature as is consistent with the required concentration of the metal-bearing gases in the plating chamber. Such practice insures of good bonding between the insulating material and the deposit of metal.

The invention will be more fully understood by reference to the following description and to the accompanying drawing wherein the single figure sets forth a schematic representation of the apparatus for the practice of the invention.

Referring to the drawing, there is shown generally at A a constant temperature system for the supplying of gases at uniform temperature conditions to the remainder of the system; there is shown at B a carrier system for the passage of continuous lengths of insulating material through the unit; there is shown generally at C a system of plating chambers connected with the constant temperature system A and the carrier system B; and there is shown at D a recovery system for the gases exhausted from the plating chamber.

Referring first to the constant temperature system A, there is shown at 1 a cylinder containing carbon dioxide 2 under pressure. The cylinder 1 is equipped with a valve 3 and a gauge 70 for indicating the flow of gases to a line 4 terminating at 5 in a coil which closely surrounds carburetor casing or gas mixing chamber 6 containing granular copper acetylacetonate 7. Tubular coil 5 and carburetor 6 are immersed in oil contained in tank 9 and this assembly is heated by electrical heater 10 provided with a thermostatic control indicated generally by element 11 and conductor 12 which latter is secured to the heater 10 in a known manner.

The tubular coil 5 is connected into the base of the carburetor casing 6 which casing has an insulated conduit 13 extending from the top thereof. Conduit 13 passes into the top of a plating chamber 42 of plating system C. Conduit 13 is also provided with a valve 14 and a by-pass line containing valves 15, 16 and pump 17. A second by-pass line 18 provided with valve 19 extends from the conduit 13 to the bottom of the plating chamber 44. Line 18 is also provided with valve 20 and a by-pass line containing valves 21, 22 and pump 23.

The carrier system B for the movement of the insulating material comprises a chamber 25 opens to the air at inlets 32, 33 and outlet 34. The chamber contains rollers 27, 28, 29 and 31 over which the insulated material 30 may pass from reel 24.

The chamber 25 and its contents are heated by heater unit 35. A conduit 36 is connected to the right hand side of chamber 25 and contains roller 38 and roller 39 forward of which is positioned electrical resistance heater elements 37. The right hand end of conduit 36 is connected to plating chamber 42 through seal 46 and chamber 52 is in turn connected to conduit 71 through gas tight seal 47 and the right hand end of conduit 71 is connected to chamber 44 by a similar gas tight seal 48. The right hand end of chamber 44 is connected through seal 49 to a tubular portion 72 containing gas tight seals 50 and 51. Closely adjacent the right hand end of tubular member 72 is take-up reel 40 driven by a variable speed motor 41.

The carrier system may be provided with pairs of rollers 64, 65, 66, 67 and 68, 69, each pair being adapted for a close engagement thereof with insulating material 30.

Plating system C comprises the plating chambers 42, 44. The inlet end of chamber 42, as already noted, is connected to conduit 13 of system A. The outlet end of chamber 42 is provided with a conduit 52 having a valve 43 therein. The lower portion of chamber 44, as has been noted hereinbefore, is connected with conduit 18 and the upper end of this chamber is provided with a conduit 53 having a valve 45; conduit 53 extends down and connects with line 52 below the valve 43.

The recovery system D comprises a tank 56 containing cooling water 55 which passes in through inlet 57 and out through outlet 58. A trap 54 has one end thereof connected to line 52, while the other end of the trap is connected through valves 59 and 60 to the atmosphere.

The exhaust line 73 from the trap 54 is also provided with a by-pass having valves 61, 62 and a vacuum pump 63.

Considering the operation of the apparatus generally, insulating glass fabric as at 30 may be passed through reel 24 through the preheating chamber 25 into conduit 36 where further heating of the material takes place. The material is then drawn through to the plating chambers where the metallic deposition takes place and then past the seals 46, 47, 48, 49 and the outer seals 50, 51, and the plated material wound up on the roller 40.

More specifically it is generally desirable to initiate the operation by passing a tail through the carrier system B and then pulling the glass fabric through with said tail. Such procedure eliminates waste of expensive material.

The fabric 30 entering chamber 25 is heated by warm air rising from the vicinity of inlets 32, 33 and heater 35 to outlet 34. The preheated fabric then passes into conduit 36 and is supported in its passage therethrough by the pair of rolls 38, 39 between which rolls the fabric passes. Prior to entering between the rolls 38, 39 the fabric is additionally heated by heater 37 to a temperature of about 600° F. Meanwhile valve 3 of cylinder 2 has been released to pass a given quantity of gas through line 4 and coil 5. The temperature of the oil 8 has been brought to the desired carburetor temperature of 375° F. through means of heater 10 and accordingly carbon dioxide gas before entering the carburetor 6 will be heated. Since material 7 of carburetor 6 also lies in the heated oil, vapor pressures of copper acetylacetonate will have been developed in the chamber and the entering heated carbon dioxide will sweep these gases into conduit 13.

In the embodiment of the invention being described valves 14 in line 13 and valve 20 in line 18 may be considered to be closed, all others being opened. Under this condition plating gas will pass from line 13 through valve 15, pump 17 and valve 16 to plating chamber 42, while another portion of the gas will pass through line 18, valve 21, pump 23 and valve 22 to the bottom of chamber 44. The gases entering the top chamber 42 will be forced downwardly by the action of pump 17 and will contact glass fabric 30 heated to temperature of approximately 600° F.

The metal-bearing vapors when they contact the heated fabric will decompose depositing metal on the upper surface thereof, very little decomposition taking place upon the lower surface. Meanwhile the vapors from line 18 entering plating chamber 44 at the base will contact the lower surface of material 30 depositing vapors thereon. The gases of decomposition from both chamber 42 and chamber 44 will pass through valves 43 and 45, respectively, and to the recovery apparatus 54 in tank 56, wherein any metal-bearing vapors not decomposed will be settled out while the more volatile gases such as carbon dioxide and carbon monoxide will pass on to line 73 through open valves 59, 60 to the atmosphere. Valves 61 and 62 are in this instance maintained closed and vacuum pump 63 is not operated.

Meanwhile the heated glass fabric containing the metal coats will pass through the seals 50, 51 and be wound up on reel 40 driven by motor 41. In this passage the material may be air cooled or may be wound up in the heated condition as desired.

It will be clear that where it is not desired to apply plating gases to both sides of the insulated fabric workpiece, the upper side may be readily coated by shutting off valve 19, thus directing all the plating vapors through chamber 42. Similarly, the under side of the material may be coated by simply closing valves 14, 15 of line 13 and opening valves 19, 20, or where desired valves 19, 21, 22.

It will also be noted that the apparatus may be operated under vacuum conditions by closing valve 59 and opening valve 61 to vacuum pump 63. In this condition valves 15, 16, 21, 22 should also be closed.

Further examples of operating conditions particularly suitable for the practice of the invention are set forth in the following Examples II and III.

EXAMPLE II

Metal-bearing compound_____ Chromium carbonyl.
Non-conductive material_____ Fiber glass wool.
Carrier gas_____ Carbon dioxide.
Flow rate of the carrier gas___ 3 liters per minute.
Plating pressure_____ Substantially atmospheric.
Carburetor temperature _____ 180° F.

EXAMPLE III

Metal-bearing compound_____ Nickel carbonyl.
Non-conductive material_____ Asbestos fabric.
Carrier gas_____ Carbon dioxide.
Flow rate of the carrier gas___ 7 liters per minute.
Plating pressure_____ Substantially atmospheric.
Carburetor temperature _____ 75° F.

The preferable temperature range for the non-conductive material is between about 550–700° F. but may be varied to meet specific plating gas conditions.

The flow rate of the carrier gas entering the heating coil 5 preferably varies between about 1 to 10 liters per minute and the actual volume contacting the insulating material will be higher due to the metal-bearing vapor pick up and heating. Normally the flow rate is not critical and with given apparatus the stated rate of 10 liters may be exceeded. However the velocity attained by the gas mixture moving against the insulating material should not be such that the material will be cooled by the gases. Should this occur inferior plating and even oxide formation may occur.

It will be understood that this invention is susceptible to modification in order to adapt it to different usages and conditions and accordingly, it is desired to comprehend such modifications within this invention as may fall within the scope of the appended claims.

I claim:

1. Apparatus for gas plating continuous lengths of electrically non-conductive material by subjecting the same to a heat-decomposable gaseous metal bearing compound and heat decomposing the same while in contact with said material, said apparatus comprising an elongated enclosure, said enclosure comprising a heating chamber for preheating said material and a plurality of chambers arranged in cooperating relationship therewith and through which the preheated material is moved from said preheating chamber, means arranged in spaced relationship throughout said elongated enclosure for supporting and guiding said material as drawn from a source and after plating rolled up on a storage reel, means for heating said preheating chamber to heat said material to a temperature above that at which the heat-decomposable gaseous metal compound decomposes, said plating chambers comprising a first plating chamber connected to said heating chamber and a second plating chamber spaced from and connected by a gas impervious enclosure to said first chamber, said plating chambers forming elements of said enclosure and disposed transversely thereof, means for supplying thermally decomposable metal bearing plating gas at a constant temperature, means for admixing an inert carrier gas with said plating gas, means for introducing the resultant mixture of plating gas and carrier gas into said first plating chamber and flowing the same in contact with the upper surface of the material, and introducing said plating gas into the second plating chamber in opposite direction to that of said first plating chamber whereby to plate the opposite surface of said material, said plurality of plating chambers being arranged to plate one side in one chamber and then the opposite side of said material in the other chamber as the same is moved therethrough.

2. In apparatus for gas plating continuous lengths of electrically non-conductive material by subjecting the same to heat decomposable gaseous metal bearing compound and heat decomposing the same while in contact with said material, said apparatus comprising an elongated enclosure through which said material is moved, said enclosure comprising a heating chamber for preheating said material and a plurality of chambers arranged in cooperating relationship therewith and through which the preheated material is moved from said preheating chamber, means for supplying said heat decomposable gaseous metal bearing compound at uniform temperature, means for heating said preheating chamber to heat said material during the passage of continuous lengths of insulating material through said enclosure, said plurality of chambers comprising first and second plating chambers spaced longitudinally of said enclosure and through which said material is moved, means for conveying the material to be plated from a storage source through said enclosure and plating chambers, said plating chambers having inlet and outlet openings for the introduction of said heat decomposable gaseous metal bearing compound which is heat decomposed in contact with said material, said inlet openings being arranged to introduce plating gas into said first chamber on one side of said material and into said second chamber on the opposite side of said material, whereby the same is gas plated with metal first on one side and then on the opposite side as said material is moved through the enclosure and wound up on a storage reel, means comprising a condenser which is connected to the outlet of each of said plating chambers for recovering waste gases and metal plating gas discharged from said plating chamber, and means comprising a vacuum pump for maintaining sub-atmospheric pressure conditions in said plating chambers, said plurality of plating chambers being thus arranged to plate one side in one chamber and then the opposite side of said material in the other chamber as the same is moved therethrough.

References Cited in the file of this patent
UNITED STATES PATENTS

| | | |
|---|---|---|
| 2,324,787 | Lundgren | July 20, 1943 |
| 2,332,309 | Drummond | Oct. 19, 1943 |
| 2,478,817 | Gaiser | Aug. 9, 1949 |
| 2,587,036 | Germer et al. | Feb. 26, 1952 |
| 2,656,284 | Toulmin | Oct. 20, 1953 |
| 2,671,739 | Lander | Mar. 9, 1954 |